Nov. 14, 1933.    N. SINGER    1,934,997
CUTTING MECHANISM
Filed Jan. 8, 1931    3 Sheets-Sheet 1

Inventor
Nathan Singer,
By Wolfe, Hirschales & Johnston
Attorneys

Nov. 14, 1933.  N. SINGER  1,934,997
CUTTING MECHANISM
Filed Jan. 8, 1931   3 Sheets-Sheet 2

Inventor
Nathan Singer,
By Wolfe, Hindshaw & Johnston
Attorneys

Nov. 14, 1933.  N. SINGER  1,934,997
CUTTING MECHANISM
Filed Jan. 8, 1931   3 Sheets-Sheet 3
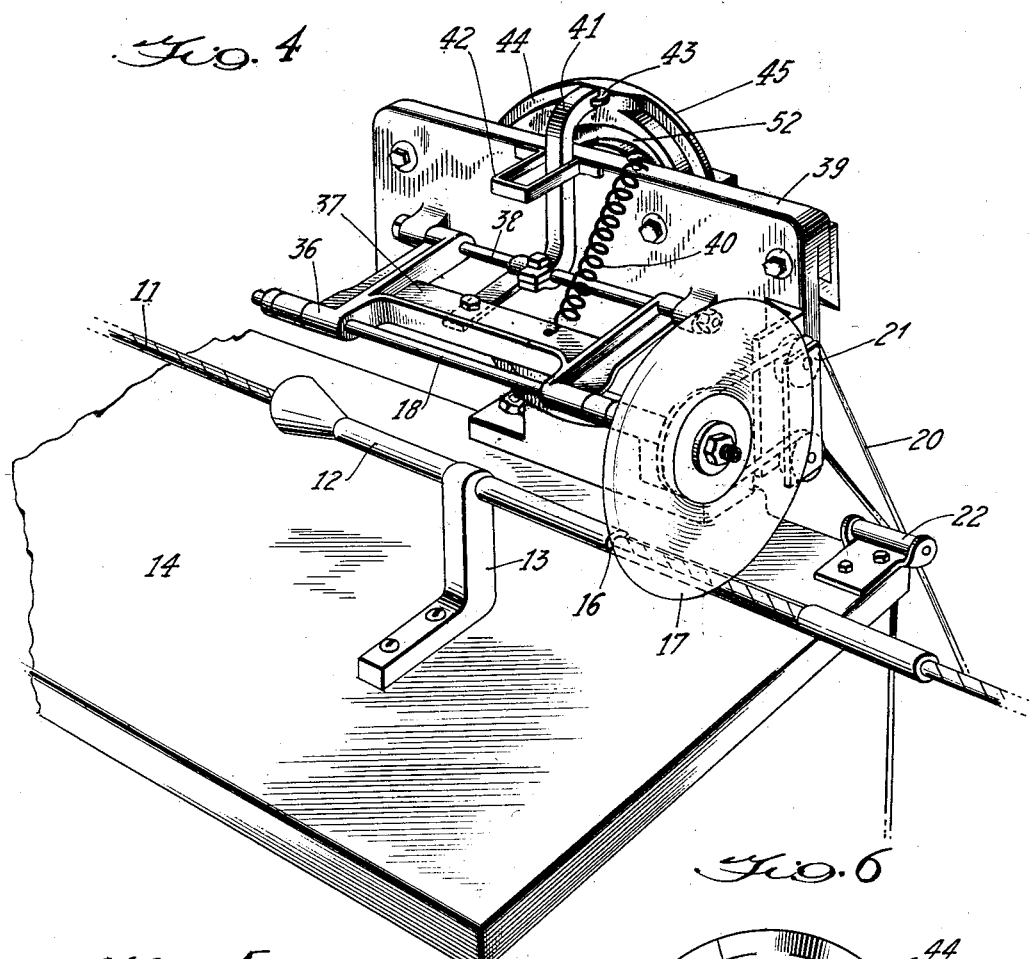
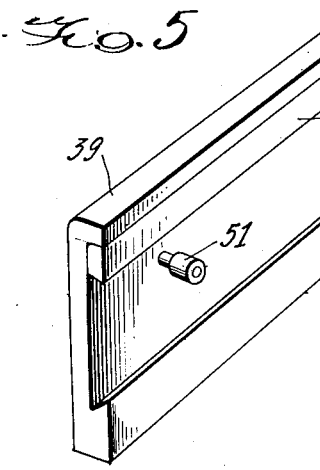
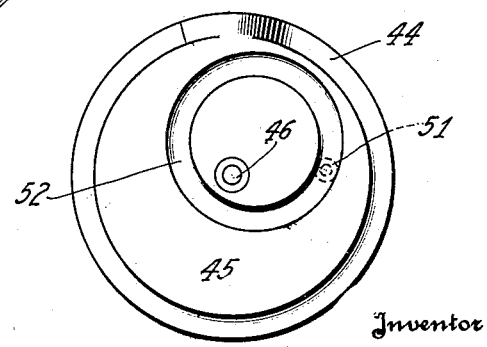
Inventor
Nathan Singer,
By Wolf, Littlehales & Johnston
Attorneys Patented Nov. 14, 1933

1,934,997

UNITED STATES PATENT OFFICE 1,934,997

CUTTING MECHANISM

Nathan Singer, Montreal, Quebec, Canada, assignor to Stone Straw Corporation, Washington, D. C., a corporation of Delaware Application January 8, 1931. Serial No. 507,442

2 Claims. (Cl. 164—61)

This invention relates to a machine and method for cutting off predetermined lengths of a continuously moving length of material without mutilation at the point of severing and without bending or buckling.

It is an object of the invention to provide a machine of this type which will be effective in use and which may be operated at high speed. It is a further object of the invention to provide an improved method of cutting moving material into predetermined lengths. Other objects and advantages of the invention will appear hereinafter.

The nature and objects of the invention will be better understood from a description of a particular illustrative embodiment thereof, and for the purpose of such description reference should be had to the accompanying drawings forming a part hereof, and in which:

Fig. 4 is a perspective view of the machine; and

Figs. 5 and 6 are detail views of parts of the machine.

Figure 1:
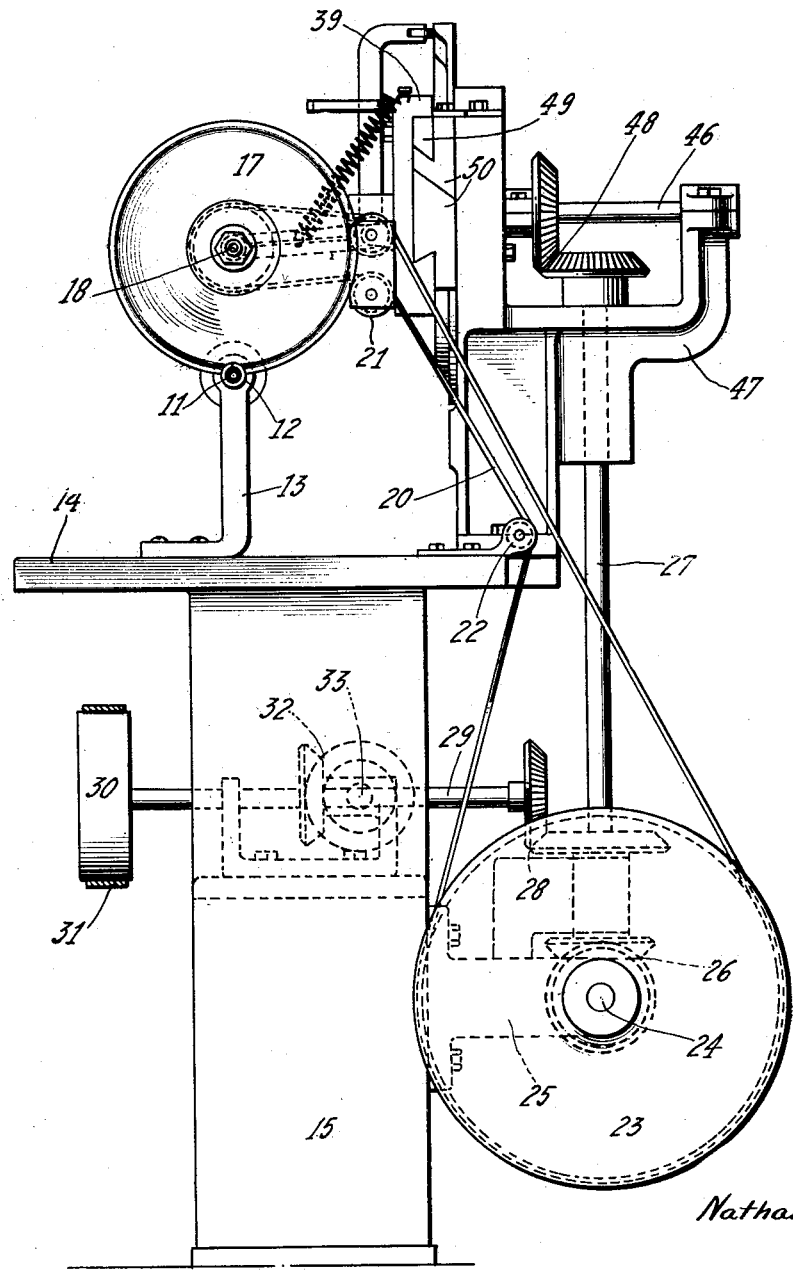
Fig. 1 is an end elevation of the illustrative embodiment.
Figure 2:
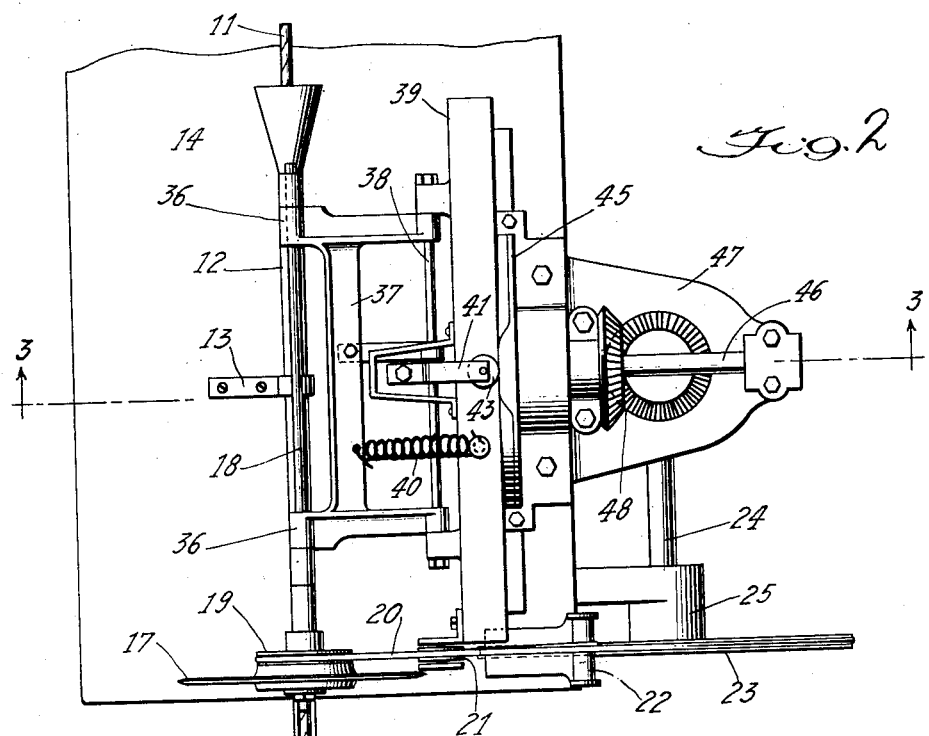
Fig. 2 is a plan view of the machine.
Figure 3:
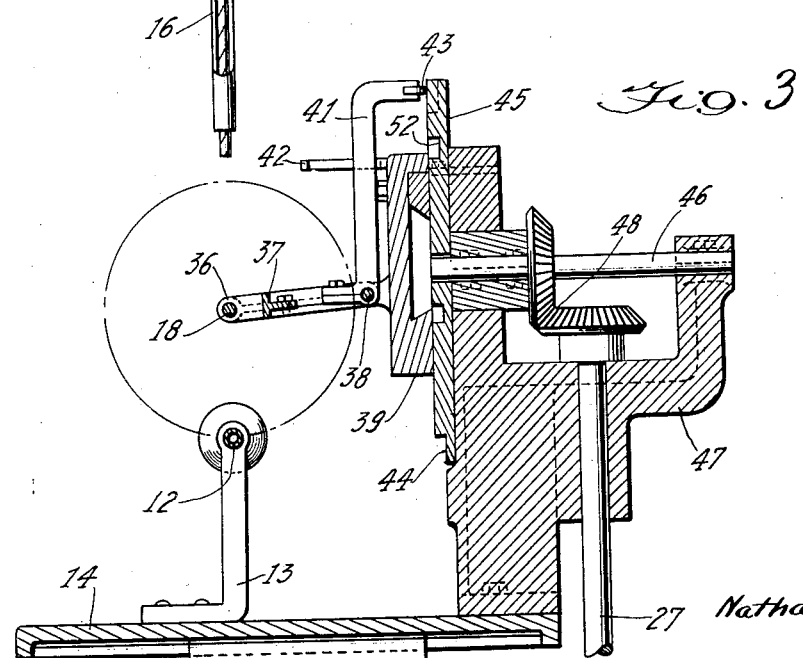
Fig. 3 is a sectional view taken substantially on the line 3—3 of Fig. 2.

Inasmuch as this invention is of particular utility in the manufacture of paper tubes, the illustrative embodiment discloses a machine designed for cutting such tubes. Many of the tube forming machines in use at the present time produce a tube which is continuously formed and fed from the machine in one rotating length, and which must thereafter be severed into the desired short sections. The machine herein illustrated is provided for this purpose, and in operation may be secured to and made a part of the general tube forming machine. However, all illustration of any tube forming mechanism has been omitted, the drawings merely showing the tube 11 as it is being fed forward from the forming machine.

In order to support the tube during the cutting operation, and to prevent bending and buckling, a tube guide 12 is provided. Conveniently the tube guide 12 is rigidly secured in the upper end of a standard 13 mounted on a bed 14 which sustains the operating parts of the machine and in turn is supported by the legs 15. In the illustrative embodiment the tube guide 12 comprises a funnel shaped entrance portion and a relatively long tubular portion, the latter being cut away along one side, as at 16, thereby forming a grooved section exposing the moving tube 11, so that the tube may be severed in the manner hereinafter described while supported by the grooved section of the guide against lateral deflection.

The tube cutting mechanism is herein shown as a rotary disk cutter 17, which may take the form of a saw, secured to a spindle 18 which is rotatably mounted on bearings 36, and which carries rigid therewith a driving pulley 19. The driving pulley is connected by a belt 20 passing over idler rollers 21 and 22 with a pulley 23 fastened on the end of a shaft 24. The shaft 24 is rotatably mounted in a bracket 25, conveniently secured to a leg 15, and is operatively connected, as by means of the bevel gears 26, shaft 27 and bevel gears 28, to a driving shaft 29. The driving shaft 29 may be connected, conveniently by the pulley 30 and a belt 31, with a driving motor, (not shown).

Desirably the cutting machine and the tube forming machine will be driven from the same prime mover in order that the speed relation will remain constant, thereby insuring the cutting off of equal lengths of tube at all times irrespective of any variations in the speed of the prime mover. Conveniently the driving connection for the tube forming machine may be made from the shaft 29, as by means of the bevel gears 32 and the shaft 33.

The bearings 36 on which the disk cutter spindle 18 is rotatably mounted form a part of the bracket 37. The bracket 37 is rigidly secured to the hinge spindle 38 pivotally mounted in bearings on the slide 39. Means are provided normally tending to turn the bracket 37 in an upward direction to keep the disk cutter out of the path of the moving tube 11, such means conveniently taking the form of a spiral tension spring 40 connecting the bracket 37 and the top of the slide 39.

Movement of the bracket 37 downwardly against the force of the spring 40 moves the rotating disk cutter 17 into the path of the moving tube 11 adjacent the grooved portion 16 of the tube guide, the tube 11 being supported against transverse deflection by the grooved guide. Since the tube 11 is rotating, the tube may be completely severed without passing the disk cutter 17 entirely through the path of movement of the tube, and consequently without physical contact between the disk cutter and the tube guide.

In the illustrative embodiment the means for turning the bracket 37 downwardly against the tension of the spring 40 comprises an upwardly extending arm 41 rigidly secured on the hinge spindle 38. The arm 41 extends through a guide bracket 42 and over the top of the slide 39, and has a roller 43 engaging a face cam track 44 on the rotatable cam member 45. As may be seen in Fig. 6, the cam track 44 in the illustrative embodiment has a single raised section for turning the bracket 37 downwardly once during each revolution of the cam member 45.

The cam member 45 is secured on a shaft 46 mounted in suitable bearings in a head 47 attached to the bed 14. Conveniently the shaft 46 is driven by means of the bevel gears 48 connecting it with the rotating shaft 27 previously referred to.

Since the tube 11 is moving along the stationary grooved guide 16 continuously during the severing operation, means are provided for moving the disk cutter 17 in the same direction and at substantially the same speed as the tube during the time that the disk cutter projects into the path of movement of the tube in order to prevent mutilation of the tube at the point of cut-off and to prevent buckling of the tube.

In the illustrative embodiment the slide 39 which carries the disk cutter bracket 37 has on its opposite face a longitudinally extending slideway fitted with a gib 49, and engaging slide blocks 50 secured on the head 47, whereby the slide may move in a path parallel to that of the tube 11. Means are provided for reciprocating the slide 39 in synchronism with the periodic movement of the disk cutter 17 into and out of the path of the moving tube. In the illustrative embodiment the slide 39 has in its slide-way a cam pin and bushing 51 engaging an eccentric cam groove 52 in a face of the rotatable cam member 45, whereby rotation of the cam member 45 causes the slide 39 to reciprocate on the slide blocks 50, the relation of the cam track 44 and the cam groove 52 being such that during the time the disk cutter 17 is being moved into and out of the path of the tube 11, the slide 39 is moving in the direction and at substantially the speed of the tube.

It will be apparent from the foregoing description that applicant has provided a machine and method for cutting a continuously moving length of material into predetermined lengths capable of effective operation at high speed without damage to the length of material, or excessive wear on the parts of the machine. The continuous length of material moves along a stationary guide which conveniently is grooved to aid in preventing lateral deflection of the material during the severing operation. A cutter mounted to one side of the guide is reciprocated along a path parallel to that of the moving material, and periodically is moved toward the guide into the path of the material to sever it, the material being supported against bending throughout the cutting operation by the guide.

The description of the illustrative embodiment is illustrative merely and is not intended as defining the limits of the invention.

I claim:

1. In a machine for cutting a continuously formed length of moving material into predetermined lengths, the combination of a stationary grooved guide along which the material moves in an exposed condition, a disk cutter mounted to one side of the guide and normally out of the path of movement of the material, means for rotating the disk cutter, means for reciprocating the disk cutter along a path parallel to that of the moving material, and means for periodically moving the disk cutter toward and away from the guide, into and out of the path of the moving material, when the disk cutter is moving in the same direction and at substantially the same speed as the material.

2. In a machine for cutting a continuous length of material which both rotates and moves longitudinally into predetermined lengths, the combination of a stationary guide along which the material moves, a disk cutter mounted to one side of the path of movement of the material, means for rotating the disk cutter, means for positively moving the disk cutter along a path parallel to that of the moving material in the direction and at a speed of the said material and for returning the cutter in the opposite direction, and means operative when the disk cutter is moving in the same direction as the material for moving the disk cutter toward and away from the guide partially into and out of the path of the material to sever the rotating material at a point continuously supported by the guide during the cutting operation.

NATHAN SINGER.